United States Patent Office 3,410,876
Patented Nov. 12, 1968

3,410,876
PROCESS FOR THE PREPARATION OF CERTAIN DIANHYDRIDES WHICH COMPRISES BRINGING INTO REACTIVE CONTACT UNDER AN ATMOSPHERE OF NITRIC OXIDE AT ELEVATED TEMPERATURE MALEIC ANHYDRIDE AND A VINYL BENZENE MATERIAL HAVING NOT MORE THAN TWO VINYL GROUPS WHEREBY THE CORRESPONDING DIANHYDRIDE IS OBTAINED
Roland Ralph Di Leone, Rowayton, Conn., assignor to American Cyanamid Company, Stamford, Conn., a corporation of Maine
No Drawing. Continuation-in-part of applications Ser. No. 266,081, Mar. 18, 1963; Ser. No. 440,292, Mar. 16, 1965; and Ser. No. 442,209, Mar. 23, 1965. This application Aug. 26, 1966, Ser. No. 575,240
6 Claims. (Cl. 260—346.6)

ABSTRACT OF THE DISCLOSURE

A process for the preparation of dianhydrides which comprises bringing into reactive contact under an atmosphere of nitric oxide at a temperature between about 30° C. and 150° C. maleic anhydride and a vinyl benzene material selected from the group consisting of styrene and ring substituted alkyl styrenes having in the alkyl substituent from 1 to 7 carbon atoms and a divinyl benzene whereby the corresponding dianhydride is obtained.

This application is a continuation-in-part of application Ser. No. 266,081, filed Mar. 18, 1963. It is further a continuation-in-part of application Ser. No. 442,209, filed Mar. 23, 1965. Still further, it is a continuation-in-part of application Ser. No. 440,292, filed Mar. 16, 1965, all now abandoned.

This invention relates to the preparation of dianhydrides by a new process which comprises reacting a vinyl benzene with maleic anhydride under an atmosphere of nitric oxide. The invention relates further to the provision of certain new dianhydrides and still further to the provision of alkyl esters of the dianhydrides produced in accordance with this invention.

It is an object of the present invention to provide a process for making dianhydrides by reacting a vinyl benzene with maleic anhydride under an atmosphere of nitric oxide, whereby the desired anhydride is obtained in significantly enhanced yields. It is a further object of the present invention to provide certain new dianhydrides. These and other objects of the present invention will be discussed in greater detail hereinbelow.

In carrying out the process provided by the present invention, maleic anhydride and the vinyl benzene compound are reacted at elevated temperature under an atmosphere of nitric oxide. Thus the maleic anhydride may first be heated at a temperature between about 30° C. and 150° C., and preferably between about 50° C. and 110° C., during which time nitric oxide is forced through the maleic anhydride, if the temperature is high enough to provide molten maleic anhydride, or as a blanket over the maleic anhydride if said anhydride is in a solid state. When the maleic anhydride has been heated and contacted with the nitric oxide, a monomeric vinyl benzene may then be added and as the solution is formed between the maleic anhydride and the vinyl benzene material, the nitric oxide can then be bubbled through the solution so as to provide an intimate atmospheric contact of the nitric oxide with the maleic anhydride-vinyl benzene material solution. As the heating continues and the dianhydride material is formed, it precipitates out of the solution as a solid material. This precipitation continues until substantially all of the dianhydride is produced.

In the reaction of the present invention, 2 moles of the maleic anhydride can theoretically react with one mole of the vinyl benzene material. Therefore, to insure the best yields of the dianhydride based on the amount of the vinyl benzene material present in the reaction mixture, one would use at least 2 moles of the maleic anhydride for each mole of the vinyl benzene material or even about a 10–20 percent excess over and beyond the stoichiometric amount of maleic anhydride calculated to completely react with the vinyl benzene material. However, it may be desirable to form a reaction mixture in which the vinyl benzene material is present in stoichiometric excess and is thus capable of acting as a solvent and a precipitation medium. An excess of the vinyl benzene material is particularly desirable when the process is carried out at the lower temperatures, i.e., below the melting point of the maleic anhydride, in which case it acts as a solvent for the maleic anhydride and also as a medium from which the desired dianhydride product can be precipitated.

The process of forming dianhydrides in accordance with the present invention involves an adduct type of reaction following a classical Diels-Alder type of reaction. Since the vinyl benzene material is susceptible to homopolymerization as well as copolymerization with maleic anhydride at elevated temperature, the nitric oxide which is used in accordance with the present invention is believed to serve the function of inhibiting the tendency toward polymer formation, and may for that reason be classed in this instance as a polymerization inhibitor. The nitric oxide has been found in this particular instance to be an exceedingly effective inhibitor against polymerization since the end products resulting from the reaction between the maleic anhydride and the vinyl benzene material is found to be substantially free of measurable or detectable polymeric material. Other known inhibitors such as quinone are nowhere near as effective in such a process since the yield of the dianhydrides is significantly diminished and the yield of polymeric material is substantially increased when all other conditions are equal.

The process of the present invention can be carried out without the benefit of any inert solvent material and preferably the earlier stages of the reaction are carried out in the absence of any solvent. However, as the dianhydride is produced and is precipitated out of solution in the vinyl benzene solvent, it is desirable to add a small quantity of an inert organic solvent to the reaction sphere in order to form a slurry of the dianhydride in the inert solvent, thereby permitting substantially complete interaction between the maleic anhydride and the vinyl benzene material for maximum yield. Among the inert organic solvents which may be used in the process of the present invention are benzene, toluene, xylene or the aliphatic hydrocarbon solvents such as hexane, heptane, octane and the like. The dianhydrides produced according to the process of the present invention are substantially insoluble in these inert organic solvents and will precipitate therefrom when and as produced, thus making it a comparatively easy matter to isolate the precipitate from the suspension medium by filtration or other mechanical separating means.

As used in the present application, the term "vinyl benzene" encompasses aromatic compounds with one or two vinyl groups and up to one alkyl group having one to seven carbon atoms. Exemplary of such compounds are styrene, o-, m-, or p-vinyl toluene, o-, m-, or p-butyl styrene, and o-, m-, or p-divinyl benzene. The term "vinyl benzene" is intended to cover pure compounds as well as isomeric mixtures such as o-, m-, and p-vinyl toluene or o-, m-, and p- divinyl benzene, etc. In fact, in many cases, the vinyl benzene material is commercially available as an isomeric mixture and such mixtures are eminently suitable for use in the process of the present invention.

Dianhydrides which result from the reaction of maleic anhydride with 2 moles of a vinyl benzene material in accordance with this invention are identified as follows:

(A) Using styrene in the reaction with maleic anhydride leads to 3,4-dicarboxy-1,2,3,4-tetrahydro-1-naphthalenesuccinic dianhydride.

(B) Using a lower-alkylvinyl benzene in the reaction with maleic anhydride leads to the corresponding 5-, 6-, 7- or 8-lower-alkyl 3,4 - dicarboxy-1,2,3,4-tetrahydro-1-naphthalenesuccinic dianhydride. If the alkyl vinyl benzene starting material is a mixthre of isomers, then the dianhydride product will correspondingly be a mixture of isomeric dianhydrides. As examples of dianhydrides in this category, there can be named 3,4-dicarboxy-1,2,3,4-tetrahydro-6-(and 7-)-methyl-1-naphtalenesuccinic dianhydride and 3,4-dicarboxy-1,2,3,4-tetrahydro-6-(and 7-)-butyl-1-naphthalenesuccinic dianhydride.

(C) Using a divinyl benzene such as m-divinyl benzene either in pure form or admixed with p-divinyl benzene and/or o-divinyl benzene in the reaction with maleic anhydride, there is obtained a dianhydride based upon phenanthrene, i.e., the compound 3,4,7,8-tetracarboxy-1,2,3,4,5,6,7,8-octahydrophenanthrene 3,4; 7,8-dianhydride.

The phenanthrene dianhydride described in the immediately preceding paragraph is a new composition of matter and constitutes one aspect of the present invention. The phenanthrene dianhydride can be used as a curing agent for synthetic resins as well as an intermediate in the preparation of other useful compounds, particularly resin-forming monomeric materials. Thus the phenanthrene dianhydride can be reacted with mono-amines to give monomeric monoimide or diimide products which are useful as building blocks for polymer formation, as curing agents, as plasticizers and as synthetic lubricants. The reaction to form the monoimide and the diimide is illustrated in the following Equation A:

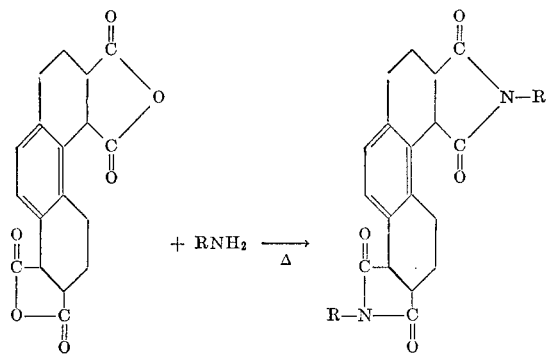

wherein R is either hydrogen, monocyclic or dicyclic such as phenyl, diphenyl ether, naphthyl, an alkyl group of up to 10 carbon atoms, e.g., methyl, ethyl, propyl, isopropyl and the like or a lower alkenyl (e.g., vinyl or aryl).

The phenanthrene dianhydrides produced by the process of the present invention can additionally be used to form polymeric diimides which are tough, hard, fusible materials with outstanding thermal and oxidative stability and thus suitable as potting resins, encapsulating resins, molding compounds, adhesives, laminating resins, surface coating resins and the like. Such polyimides can be prepared by a reaction which is illustrated in the following Equation B:

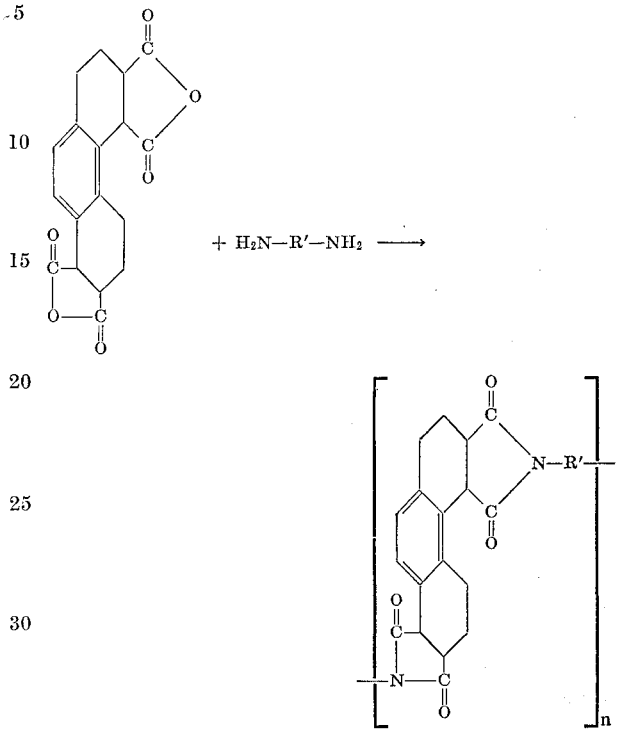

wherein R' is either alkylene (e.g., ethylene, propylene, hexylene, heptylene and dodecylene) or arylene (e.g., phenylene, naphthylene or oxydiphenylene) and $n$ is a positive integer of from 1 to about 400.

The dianhydrides resutling from the reaction of styrene or alkyl vinyl benzenes can be used in the same manner as the above-described phenanthrene dianhydride to form imide derivatives. Such imides are useful in the same manner as the imides formed from phenanthrene dianhydride, since they are tough, hard, fusible materials with good thermal and oxidative stability.

In addition to the foregoing uses for the dianhydrides prepared in accordance with the present invention, they may also be converted to ester derivatives by reaction with either monohydric or dihydric alcohols. The reaction with a monohydric alcohol (e.g., methanol, ethanol, propanol, allyl alcohol, etc.) produces monomeric ester materials which can be used as plasticizing agents for polyvinyl chloride and polyvinylidene chloride compositions in the place of conventional dialkyl phthalate plasticizers. The reaction with polyhydric alcohols such as monomeric alkylene glycols and polymeric alkenylene glycols yields polyesters which are capable of forming films which are hard, tough, and solvent resistant, and thus are useful as coating and molding compositions.

The compound 3,4 - dicarboxy-1,2,3,4-tetrahydro-1-naphthalenesuccinic dianhydride will be referred to hereinbelow sometimes as tetralin dianhydride for the sake of simplicity and sometimes by the symbol "TDA" for the sake of brevity.

The following examples are presented to illustrate the various aspects of the present invention. Any specific enumeration of detail contained therein is not to be interpreted as a limitation of the invention except as indicated in the appended claims. Unless otherwise indicated, all parts and percentages are on a weight basis.

Example 1

Into a suitable reaction vessel equipped with stirrer, thermometer, reflux condenser, gas inlet and outlet tubes there is introduced 216 parts of maleic anhydride. The charge is heated on a steam bath until the maleic anhydride melts. Thereupon the system is flushed with nitric oxide. After thoroughly saturating the system with nitric oxide (in about 10 minutes), 104 parts of monomeric styrene is added and the reaction mixture is heated on a steam bath at a temperature between about 90–95° C. After about 2 hours of heating, a crystalline product starts to precipitate out of solution. The reaction is continued for an additional 6 hour period after which time 800 parts of a 5:1 toluene-acetone mixture is added. The product is slurried in the solvent mixture for about 15 minutes at the steam bath temperature (90–95° C.) and is then collected by suction filtration. The product had a melting point of 197–198° C. and showed the following analysis.

Calculated for $C_{16}H_{12}O_6$: C, 64.00; H, 4.00. Found: C, 63.41; H, 4.29.

The product is a white solid which is soluble in acetone and when recrystallized from an acetone solution the product is white and has a melting point of about 202–3° C. and is in the form of needles or prisms.

The tetralin dianhydride thus produced can be used to make a substantial plurality of derivatives such as diimides, esters including polyester resin compositions and can be used directly as a coreactant for curing epoxy resin compositions.

In order to prepare the diimides from the TDA, one would react a primary amine with the TDA in a mole ratio of 2:1 amine to TDA, respectively. In carrying out such a diimide formation process, no externally applied heat is generally necessary inasmuch as in many instances a slight exotherm develops and it may then be necessary to apply some cooling to the system in order to prevent a possible exotherm runaway. Among the primary amines which may be used to form the diimides of the present invention are the alkyl amines such as methyl amine, ethyl amine, propyl amines, butyl amines and the like. If it is desired to form polymerizable diimides, one would utilize such compounds as allyl amine, methallyl amine and the like. Aromatic amines can also be used such as aniline, m-phenylene diamine and the like.

In order to illustrate the method for the preparation of these diimides, the following examples are set forth in which all parts are parts by weight. As before, these examples are set forth primarily for the purposes of illustration and any specific enumeration of detail contained therein should not be interpreted as a limitation on the case except as is indicated in the appended claims.

Example 2

Into a suitable reaction vessel equipped with stirrer, thermometer, reflux condenser and a Dean Stark trap, there is introduced 100 parts of TDA, 38 parts of allyl amine and 300 parts of xylene. The charge is heated to the reflux temperature until the theoretical measure of water calculated to be removed is obtained. This takes approximately 4 hours. On cooling the xylene solution, the product precipitates out to give a yield of 106 parts which is 93% of theoretical. The product is recrystallized from ethanol to give a solid having a melting point of 160° C.

To 10 parts of the product thus produced and identified as the diallyl imide of TDA, there is added 2% by weight of 2,5-dimethyl-2,5-di(t-butylperoxy)hexane and the mixture is heated at 170° C. for 72 hours. The small casting produced was hard and tough.

Example 3

Into a suitable reaction vessel equipped as in Example 2, there is added 60 parts of TDA dissolved in 380 parts of acetonitrile. While stirring constantly and cooling as necessary in order to maintain a temperature below about 30° C. there is added 54.6 parts of 2-ethyl hexyl amine in comparatively small increments. After the addition is completed, the mixture is stirred for an additional 2 hours. The solvent is then removed and the residue is treated with refluxing acetic anhydride for 4 hours. The acetic acid formed and the excess acetic anhydride is then stripped off. The product is then distilled under vacuum to yield a viscous oil. The infrared spectrum and analysis showed the product to be the 2-ethyl hexyl diimide of TDA. The decomposition temperature of the product as measured in an isoteniscope is 380–390° C. Among other end uses this particular diimide is useful in areas requiring fluids with high temperature stability, e.g., lubricants, heat exchange fluids and the like.

Example 4

Into a suitable reaction vessel equipped as in Example 2 there is introduced 30 parts of TDA, 10.8 parts of m-phenylene diamine and 170 parts of dimethyl formamide. The charge is mixed at about room temperature (25° C.) but the reaction mixture exothermed to 42° C. The stirring continued for about 19 hours. The product produced is precipitated from the dimethyl formamide solution by adding thereto 200 parts of water. The precipitate is collected by suction filtration and dried at 100° C. for 3 hours. A quantitive yield of the corresponding polycarboxyamide is obtained. This is readily dehydrated to the corresponding polyimide by heating the product thus produced under a vacuum of 0.25 mm. at 200° C. for 3 hours. This step produced a polyimide with a softening point of 230° C. and inherent viscosity of 0.26 in dimethyl formamide.

Example 5

Into a suitable reaction vessel equipped as in Example 2 there is introduced 200 parts of TDA dissolved in 300 parts of nitromethane. Anhydrous ammonia is bubbled into a solution until the diamide no longer precipitates. The white solid produced is collected and air dried. The product is identified as the diamide of TDA. 40 parts of this diamide are suspended in 400 parts of xylene and the mixture is charged to a suitable reaction vessel equipped with stirrer, thermometer, condenser and Dean Stark trap. The mixture is then heated to reflux until the theoretical amount of water is removed which takes about 3 hours. The product thus produced is the diimide of TDA. The reaction mixture is then cooled and a solid product is collected by suction filtration. A quantitive yield is obtained.

The potassium salt of said diimide can be used for reaction with alkyl halides, aryl halides, and/or aralkyl halides to prepare N-substituted imides and polyimides. Additionally said diimide can be reacted with formaldehyde to form the dimethylol derivative which can be cured with an acid catalyst to produce a thermoset resin composition.

The following examples will be used to illustrate the preparation of simple alkyl esters of TDA.

Example 6

Into a suitable reaction vessel equipped with stirrer, thermometer, condenser and Dean Stark trap there is introduced 150 parts of TDA and 650 parts of 2-ethyl-hexanol. The charge is heated at about 172–192° C. for about 4½ hours while removing 1 mole of water. The excess 2-ethyl-hexanol is removed by flash evaporation. The resulting product, namely, the 2-ethyl-hexanol tetraester of TDA weighed 380 parts representing a 93% yield.

Example 7

Into a suitable reaction vessel equipped as in Example 6, there is introduced 150 parts of TDA, 370 parts of n-butanol and 100 parts of toluene. The charge is heated with a few drops of concentrated sulfuric acid at 116–121° C. for about 50 hours during which time 18 parts of water are removed. The product is stripped of excess butanol by flash evaporation to give a product weighing 266 parts or 95% yield.

Each of the two esters of TDA thus produced are useful as plasticizing agents for polyvinyl chloride and polyvinylidene chloride compositions in the place of dioctyl phthalate, dibutyl phthalate and the like.

Example 8

A commercially available bis phenol-epichlorohydrin reaction product having a molecular weight between 20,000 and 30,000 (essentially polyhydroxy ether polymer) is dissolved in methyl ethyl ketone at 40% solids. There is added thereto 10% by weight based on the weight of the polymer solids of TDA. Films from the solution are drawn down on glass and metal plates. The solvent is allowed to evaporate and the films cured in two ways: (a) at room temperature for 24 hours; and (b) 30 minutes at 120° C. Both sets of films exhibited water and solvent resistance. The room temperature cured films are slightly softer than the baked films. In all cases, excellent adhesion to the substrate is noted.

Example 9

An acrylic copolymer comprising 95% by weight of methyl methacrylate and 5% by weight of β-hydroxy ethyl acrylate is blended with 5% by weight of TDA in methyl ethyl ketone at 30% solids. Films are drawn down on glass and metal plates, air dried at room temperature and then cured for 30 minutes at 150° C. The resulting films are tough and display chemical resistance. The adhesion to the substrate is excellent.

Example 10

A blend of 300 parts of TDA and 144 parts of cyclohexane dimethanol is dissolved in 4,000 parts of dry dioxane. The reaction mixture is stirred for several hours and is then heated to the reflux temperature and maintained at that temperature for about 4 hours. The reaction mixture, after cooling, is highly viscous. A film of the polymer was found to be hard and tough.

Example 11

144 parts of cyclohexane dimethanol and 111 parts of phthalic anhydride are reacted at 180–190° C. until all of the water of reaction is collected. The reaction mass is cooled to about 100–110° C. and 75 parts of TDA are added gradually. The reaction is continued at 100–110° C. for 3 hours after the addition is completed. The product produced is a hard, glassy material. A portion of this product is then ground with 5% of barium oxide and compression molded at 150° C. for 30 minutes. The finished molding is hard and solvent resistant. Another portion of the polyester resin is dispersed in water containing sufficient ammonium hydroxide to dissolve the polymer. To this solution is added 10% by weight of the hexamethyl ether of hexamthylol melamine. Films drawn down on a glass plate from this solution were air dried and then baked for 30 minutes at 150° C. to give films which are hard and solvent resistant.

In addition to the phthalic anhydride used hereinabove, other dicarboxylic acids free of non-benzenoid unsaturation can be used as modifiers for the TDA polyesters such as oxalic, malonic, succinic, glutaric, sebacic, adipic, pimelic, suberic, azelaic, tricarballylic, citric, tartaric, malic and the like. If it is desired to incorporate a measure of polymerizable unsaturation into the polyester resin composition, one may use, with the TDA and the polyhydric alcohol, an α,β-ethylenically unsaturated dicarboxylic acid such as maleic, fumaric, aconitic, itaconic and the like. When these unsaturated acids are used in the polyester resin compositions, they can be used with a cross-linking monomer such as styrene, diallyl phthalate and the like. This class of polyester resin compositions is generally known and is shown in the U.S. Patents 2,255,313; 2,443,735–41, inclusive, among others.

Example 12

A blend of 12 parts of TDA and 18.8 parts of a commercially available diglycidyl ether of bis phenol A having an epoxy equivalent of 180–195 is charged into a suitable reaction vessel and heated at 160–180° C. to yield a clear, viscous resin. The resin is spread along aluminum lap shear panels and cured for 1 hour at 200° C. at 500 p.s.i. in a press and is then postcured for 16 hours at 100° C. When cooled to 23° C., the lap shear value was 1150 lbs./sq. inch.

Example 13

Example 12 is repeated in all details except that 6.2 parts of TDA are heat blended with 25 parts of a commercially available bis phenol A-epichlorohydrin reaction product having an epoxy equivalent of 425–550. The lap shear value at 23° C. is 2744 lbs./sq. inch.

Example 14

Example 12 is repeated in all details except that 3.8 parts of TDA is heat blended with 30 parts of a commercially available bis phenol A-epichlorohydrin reaction product having an epoxy equivalent of 875–1025. The lap shear value at 23° C. is 4370 lbs./sq. inch.

Example 15

Example 12 is repeated in all details except 1.87 parts of TDA are blended with 35 parts of a commercially available bis phenol A-epichlorohydrin reaction product having an epoxy equivalent of 2000–2500. The lap shear value at 23° C. is 4930 lbs./sq. inch.

Example 16

5 parts of the epoxy resin used in Example 13, 2 parts of TDA and 5 parts of methyl ethyl ketone are blended together and heated to reflux until a clear solution is attained (approximately 2 hours). The Gardner-Holdt viscosity of the product thus prepared is about 0 at 23° C. The solution is diluted with additional methyl ethyl ketone to a Gardner-Holdt viscosity of M for use in impregnating glass cloth.

Example 17

Example 16 is repeated in all details except that the epoxy resin used is the same as that of Example 14. The initial Gardner-Holdt viscosity at 23° C. is about Z. As in Example 16 the solution was diluted with methyl ethyl ketone to a viscosity of M.

Each of the above solutions are used to impregnate glass cloth fabric. The impregnated fabrics are air dried and a 12 ply laminate is prepared from each. The resin content of the laminate was about 45–50%. The laminates are cured in a press for 1 hour at 300 p.s.i. at 160° C. followed by a postcured cycle for 16 hours at 170° C. in an oven. The laminates thus produced are craze free and transparent and have the following properties.

TABLE I

| | Example 16 | Example 17 |
|---|---|---|
| Barcol Hardness | 72 | 68 |
| Flex Modulus 23° C., p.s.i | $3.49 \times 10^6$ | $2.73 \times 10^6$ |
| Flex Modulus 150° C., p.s.i | $1.90 \times 10^6$ | $0.94 \times 10^6$ |
| Flex Strength 23° C., p.s.i | $83.7 \times 10^3$ | $64.9 \times 10^3$ |
| Flex Strength 150° C., p.s.i | $24.3 \times 10^3$ | $10.3 \times 10^3$ |

Example 18

5 parts of the epoxy resin used in Example 12 and 3 parts of TDA are blended together and heated to 160–170° C. until a clear solution is obtained (approximately 20 minutes). Wet lay-ups are prepared on a piece of glass cloth and a 12 ply laminate is then prepared by curing the impregnated cloth in a press for 72 hours at 160° C. and 30 p.s.i. The laminate thus produced is postcured in an oven for 16 hours at 170° C. This procedure produced a craze-free and transparent laminate having the following physical properties.

TABLE II

Barcol hardness _____ 45.
Flex modulus _____ 23° C.—2.98×10⁶ p.s.i.; 150°
  C.—1.75×10⁶ p.s.i.; 200°
  C.—1.44×10⁶ p.s.i.
Flex strength _____ 23° C.—65.9×10³ p.s.i.; 150°
  C.—28.1×10³ p.s.i.; 200°
  C.—14.1×10³ p.s.i.
Flex modulus after aging
  192 hours at 200° C. _ 23° C.—2.64×10⁶ p.s.i.
Flex strength after aging
  192 hours at 200° C. _ 23° C.—53.6×10³ p.s.i.
Weight loss after aging
  192 hours at 200° C. _ 0.52%.

Example 19

A plurality of castings are prepared in which stated amounts of TDA are blended with the epoxy resin used in Example 12 at room temperature and slowly heated to 180° C. at which temperature the components become compatible with one another. The heated blend is deaerated under vacuum and poured between two cellophane covered glass plates to yield ⅛ inch castings. The results and properties of each of these castings is shown hereinbelow in Table III.

Example 20

10 parts of 3,4-epoxy-6-methylcyclohexylmethyl-3,4-epoxy-6-methylcyclohexanecarboxylate is heated to 150° C. and is blended with 8 parts of melted TDA. The solution is clear almost instantly and remains clear even as the blend is cooled to room temperature. The blend is deaerated as in Example 19 and castings are prepared therefrom. The results of these tests are also shown in Table III.

which at this point is a highly viscous mixture. Nitric oxide is continuously passed into the reaction mixture throughout the reaction. When the reaction is completed, nitric oxide addition is stopped and residual nitric oxide is removed by purging with nitrogen. The mixture is cooled to room temperature and the precipitated dianhydride is removed by filtration and recrystallized from hexane, yielding a fine white powder in approximately 90% yield. The product does not have a sharp melting point (since it is a mixture) and starts to melt at approximately 100° C.

Analysis for $C_{17}H_{14}O_6$.—Calculated: Carbon, 64.96; hydrogen, 4.45. Found: Carbon, 64.49; hydrogen, 5.40.

Example 22.—Preparation of 3,4-dicarboxy-1,2,3,4-tetrahydro-6(and 7)-butyl-1-naphthalenesuccinic dianhydride 98.06 parts of maleic anhydride heated to the melt are purged with nitrogen and then with nitric oxide. The nitric oxide inlet tube extends below the surface of the liquid anhydride. 240 parts of a mixture of about 60 parts of meta-butyl vinyl benzene and 40 parts of para-butyl vinyl benzene are added and the mixture is heated to 115° C. The product dianhydride precipitates out of the solution, which at this point is a highly viscous mixture. Nitric oxide is continuously passed into the reaction mixture throughout the reaction. When the reaction is completed, nitric oxide addition is stopped and residual nitric oxide is removed by purging with nitrogen. The mixture is cooled to room temperature and the precipitated dianhydride is removed by filtration and recrystallized from hexane, yielding a fine, white powder in approximately 90% yield. The product does not have a sharp melting point (since it is a mixture) and starts to melt at approximately 100° C.

TABLE III

| Composition | Cure Cycle | TGA | Barcol Hardness | Rockwell Hardness | DTL, ° C. | Izod Impact, Ft. #/in. | Flex. Str. at 23° C., #/in.² | Flex. Mod. at 23° C., #/in.² |
|---|---|---|---|---|---|---|---|---|
| Example 19A 80% Eq. TDA ¹ | 15 hrs. at 180° C. 7 hrs. at 250° C. | Air 351° C. N₂ 384° C. | | 114(M) | 246 | 0.24 | 12,300 | 490,000 |
| Example 19B 80% Eq. TDA ¹ | 15 hrs. at 180° C. 10 hrs. at 220° C. | | 25–30 | 81(E) | 247 | 0.27 | 15,700 | 520,000 |
| Example 19C 55% Eq. TDA ¹ | 15 hrs. at 180° C. 7 hrs. at 250° C. | Air 353° C. N₂ 379° C. | | 115(M) | 136 | 0.27 | 12,900 | 540,000 |
| Example 19D 55% Eq. TDA ¹ | 15 hrs. at 180° C. 10 hrs. at 220° C. | | 20–25 | 80(E) | 181 | 0.22 | 12,200 | 520,000 |
| Example 20 80% Eq. TDA ¹ | 15 hrs. at 150° C. 5 hrs. at 250° C. | | 30–35 | 93(E) | 218 | 0.19 | 4,800 | 640,000 |

¹ Containing the stated equivalents of TDA.

In blending the TDA with epoxy resinous materials such as those set forth in the previous examples one would use between about 30% and 100% by weight of the TDA based on the equivalent weight of the epoxy material. Preferably, one would use between about 55% and 80% by weight of the TDA based on the equivalent weight of the epoxy material.

Examples 21 and 22 following are presented to illustrate the preparation of dianhydrides from maleic anhydride and alkyl vinyl benzene derivatives. The products of Examples 21 and 22 can be converted to the corresponding imide products with the same reagents and by the same procedure as was used hereinbefore to prepare imides from TDA.

Example 21.—Preparation of 3,4-dicarboxy-1,2,3,4-tetrahydro-6(and 7)-methyl-1-naphthalenesuccinic dianhydride 98.06 parts of maleic anhydride heated to the melt are purged with nitrogen and then with nitric oxide. The nitric oxide inlet tube extends below the surface of the liquid anhydride. 236.3 parts of a mixture of about 60 parts of meta-vinyl toluene and 40 parts of para-vinyl toluene are added and the mixture is heated to 115° C. The product dianhydride precipitates out of the solution,

Example 23.—Preparation of N,N'-diallyl 3,4-dicarboxy-1,2,3,4-tetrahydro-6(and 7)-methyl-1-naphthalenesuccinic diimide Into a suitable reaction vessel equipped with stirrer, thermometer, reflux condenser and a Dean-Stark trap, there is introduced 105 parts of 3,4-dicarboxy-1,2,3,4-tetrahydro-6(and 7)-methyl-1-naphthalenesuccinic dianhydride, 38 parts of allyl amine and 300 parts of xylene. The charge is heated to reflux until the theoretical measure of water calculated to be removed is obtained. This takes approximately 4 hours. On cooling the xylene solution an oil separates. After removal of xylene, a 95% yield of product is obtained. The infrared spectrum of the product is in good agreement with the expected product.

Example 24.—Preparation of polyimide from p,p'-diamino diphenylmethane and 3,4-dicarboxy-1,2,3,4-tetrahydro-6(and 7)-methyl-1-naphthalenesuccinic dianhydride To 164 parts of dimethylacetamide is added 79.2 parts of p,p'-diaminodiphenylmethane. To this solution is added 3,4-dicarboxy-1,2,3,4-tetrahydro-6(and 7)-methyl-1-naphthalenesuccinic dianhydride over a 2 hour period at room temperature. The solution is stirred for 12 hours, followed by precipitation of the polyamide-acid in ethyl acetate. The solid polyamide acid is air dried for 2 hours followed by heating at 200° C. for 2 hours in a vacuum oven to convert the polymer to the polyimide. The polymer has an inherent viscosity of 0.15 in dimethylformamide.

Examples 25 through 31 which follow are presented to illustrate the preparation of phenanthrene dianhydride obtained by the reaction of maleic anhydride and divinyl benzene as well as its conversion to and the use of its diimide derivatives.

Example 25.—Preparation of 3,4,7,8-tetracarboxy-1,2,3, 4,5,6,7,8-octahydrophenanthrene 3,4;7,8-dianhydride A reaction vessel is charged with 98 parts of maleic anhydride and heat is applied until the anhydride has melted. The reaction vessel is purged with nitrogen and then with nitric oxide introduced through a tube extending below the surface of the melt. While continuing the introduction of nitric oxide through the melt, 250 parts of a meta-divinyl benzene composition are added and the mixture is heated to 95° C. The product dianhydride precipitates out of the solution during the reaction. When the reaction is completed, the precipitate is separated off by filtration, recrystallized from acetonitrile and obtained as a fine, white powder. Analysis of the product is as follows.

Theoretical: Carbon, 66.25%; hydrogen, 4.32%; oxygen, 29.43%. Found: Carbon, 66.00%; hydrogen, 4.51%; oxygen, 28.89%.

When used in about 20–30 wt. percent, this dianhydride has been found to be an excellent curing agent for epoxy resins. The epoxy resin containing said dianhydride may be used for preparing castings, laminates, molding compounds, potting resins and adhesives.

Example 26.—Preparation of N,N'-diallyl 3,4,7,8-tetracarboxy-1,2,3,4,5,6,7,8-octahydrophenanthrene 3,4;7,8-diimide To 300 parts of xylene are added 25 parts of 3,4,7,8-tetracarboxy - 1,2,3,4,5,6,7,8-octahydrophenanthrene 3,4; 7,8-dianhydride followed by an equivalent amount of allyl amine (9 parts) over a 15 minute period. The mixture is then refluxed for 2 hours and refluxing is continued for a third hour while the water is azeotroped off. On cooling, the product separates as an oil from the xylene solution. The oil is removed and solidifies on standing. Infrared analysis indicates that the expected product has been obtained.

Example 27.—Preparation of a polyimide from p,p'-diaminodiphenyl ether and 3,4,7,8-tetracarboxy-1,2,3,4,5, 6,7,8-octahydrophenanthrene 3,4;7,8-dianhydride To 280 parts of dimethylformamide is added 30 parts of p,p'-diaminodiphenyl ether. To this solution is added 49 parts of phenanthrene dianhydride over a 2 hour period at room temperature. The solution is stirred for 12 hours followed by precipitation of the polyamide-acid in ethyl acetate. The solid polyamide-acid is air dried for 2 hours followed by heating at 200° C. for 2 hours in a vacuum oven to convert the polymer to the polyamide. The polymer has an inherent viscosity of 0.16 in dimethylformamide. The above polymer is soluble in dimethylformamide, dimethylacetamide, dimethylsulfoxide and meta-cresol.

Example 28.—Preparation of N,N'-diethyl 3,4,7,8-tetracarboxy-1,2,3,4,5,6,7,8-octahydrophenanthrene 3,4;7,8-diimide To 300 parts of xylene are added 25 parts of 3,4,7,8-tetracarboxy-1,2,3,4,5,6,7,8-octahydrophenanthrene 3,4;7, 8-dianhydride followed by an equivalent amount of ethyl amine over a 15 minute period. The mixture is then refluxed for 2 hours and refluxing is continued for a third hour while the water is azeotroped off. On cooling, the product separates as an oil from the xylene solution. The oil is removed and solidifies on standing. Infrared analysis indicates that the expected product has been obtained.

Example 29.—Preparation of N,N'-diphenyl 3,4,7,8-tetracarboxy-1,2,3,4,5,6,7,8-octahydrophenanthrene 3,4;7,8-diimide To 300 parts of xylene are added 25 parts of 3,4,7,8-tetracarboxy-1,2,3,4,5,6,7,8-octahydrophenanthrene 3,4;7, 8-dianhydride followed by an equivalent amount of aniline over a 15 minute period. The mixture is then refluxed for 2 hours and refluxing is continued for a third hour while the water is azeotroped off. On cooling, the product separates as an oil from the xylene solution. The oil is removed and solidifies on standing. Infrared analysis indicates that the expected product has been obtained.

Example 30.—Preparation of 3,4,7,8-tetracarboxy-1,2,3, 4,5,6,7,8-octahydrophenanthrene 3,4;7,8-diimide To 300 parts of xylene are added 25 parts of 3,4,7,8-tetracarboxy-1,2,3,4,5,6,7,8-octahydrophenanthrene 3,4;7, 8-dianhydride followed by an equivalent amount of ammonia over a 15 minute period. The mixture is then refluxed for 2 hours and refluxing is continued for a third hour while the water is azeotroped off. On cooling, the product separates as an oil from the xylene solution. The oil is removed and solidifies on standing. Infrared analysis indicates that the expected product has been obtained.

Example 31.—Preparation of polyimide from 1,6-hexamethylenediamine and 3,4,7,8-tetracarboxy-1,2,3,4,5,6, 7,8-octahydrophenanthrene 3,4;7,8-dianhydride To 280 parts of dimethylformamide is added 18 parts of 1,6-hexamethylenediamine. To the resulting solution is added 49 parts of the product of Example 23 over a 2 hour period at room temperature. The reaction mixture is stirred for 12 hours during which time a polyamide-acid precipitates. The precipitate is separated off, recrystallized from ethyl acetate, air dried for 2 hours and heated at 200° C. for 2 hours in a vacuum to convert the polyamide-acid to the product polyimide.

I claim:
1. A process for the preparation of dianhydrides which comprises bringing into reactive contact under an atmosphere of nitric oxide at a temperature between about 30° C. and 150° C., maleic anhydride and a vinyl benzene material selected from the group consisting of styrene and ring substituted alkyl styrenes having in the alkyl substituent from 1 to 7 carbon atoms and meta-divinyl benzene whereby the compound 3,4-dicarboxy-1,2,3,4-tetrahydro - 1 - naphthalene succinic dianhydride is produced when styrene per se is used; the compound 3,4-dicarboxy-1,2,3,4-tetrahydro-7-alkyl-1-naphthalene succinic dianhydride is produced when meta-alkyl substituted styrenes are used; the compound 3,4-dicarboxy-1,2,3,4-tetrahydro-6-alkyl-1-naphthalene succinic dianhydride is produced when para-alkyl substituted styrene is used and the compound 3,4,7,8-dicarboxy-1,2,3,4,5,6,7,8-octahydrophenanthrene-3,4,7,8-dianhydride is produced when meta-divinyl benzene is used.

2. The process of claim 1 wherein the vinyl benzene material is styrene and the dianhydride product is 3,4-dicarboxy - 1,2,3,4-tetrahydro-1-naphthalenesuccinic dianhydride.

3. The process of claim 1 wherein the vinyl benzene material is vinyl toluene and the dianhydride product is a mixture of 3,4 - dicarboxy - 1,2,3,4 - tetrahydro-6(and 7)-methyl-1-naphthalenesuccinic dianhydride.

4. The process of claim 1 wherein the vinyl benzene material is meta-divinyl benzene and the dianhydride product is 3,4,7,8-tetracarboxy-1,2,3,4,5,6,7,8-octahydrophenanthrene 3,4;7,8-dianhydride.

5. The process of claim 1 wherein excess vinyl benzene material is present in the reaction mixture, thus to serve as a reaction solvent and a precipitation medium for the product dianhydride.

6. The compound 3,4,7,8-tetracarboxy-1,2,3,4,5,6,7,8-octahydrophenanthrene 3,4;7,8-dianhydride.

References Cited

UNITED STATES PATENTS 3,284,470  11/1966  Farber _____ 260—346.6

OTHER REFERENCES

Alder et al.: Justus Liebigs Annalen der Chemie, vol. 595, pp. 2–5 and 15 (1955).

NICHOLAS S. RIZZO, *Primary Examiner.*

B. I. DENTZ, *Assistant Examiner.*